Sept. 19, 1944.   N. W. LOUSLEY   2,358,722
RUBBER MASTICATING MACHINE
Filed Nov. 17, 1942   2 Sheets-Sheet 1

Sept. 19, 1944. N. W. LOUSLEY 2,358,722
RUBBER MASTICATING MACHINE
Filed Nov. 17, 1942 2 Sheets-Sheet 2

Inventor
N. W. Lousley
By Glascock Downing Seibold
Attys.

Patented Sept. 19, 1944

2,358,722

UNITED STATES PATENT OFFICE 2,358,722

RUBBER MASTICATING MACHINE

Norman Wayland Lousley, Blackburn, England

Application November 17, 1942, Serial No. 465,942
In Great Britain November 6, 1941

3 Claims. (Cl. 259—10)

This invention relates to rubber masticating machines in which rubber is masticated with rubber solvent to produce a homogeneous solution, and has for its object to provide an improved construction of machine in which the operation of mastication is very efficiently performed.

The invention consists in a rubber masticating machine comprising a horizontal drum or casing with feed chute at its upper side, a horizontal rotor or hollow cylinder with thereon a series of projecting wedge shaped blades which as the rotor revolves pass through wedge shaped gaps in one or more fixed blades extending from side to side of the machine parallel to the rotor axis and adjacent to its periphery, a double sided centrifugal impeller located within the rotor, with slots or a grid in the latter around the impeller, a grid or separator above the said slots or grid to prevent rubber falling on to the impeller from the feed chute, and guards to prevent rubber passing directly from said feed chute into the open ends of the rotor.

The invention further consists in making each fixed blade adjustable away from and towards the rotor periphery to vary the clearance between the rotor blades and the fixed blade, the latter serving also to remove from the rotor any substantial adhesions of rubber.

The invention further consists in revolving the impeller in the opposite direction to the rotor and either or both at an adjustable speed.

Referring to the accompanying sheets of explanatory drawings.

The machine comprises an outer casing $a$ which may be suitably jacketed at $b$ as shown for the circulation of coolant to prevent overheating of the rubber during mastication.

Within the said casing is disposed a cylindrical rotor $c$ carried at its ends by axles $d$ and $e$, the latter of which is hollow and carries fast and loose pulleys $f$ and $g$. The rotor cylinder is carried from the axles by spokes $h$.

Figure 1:
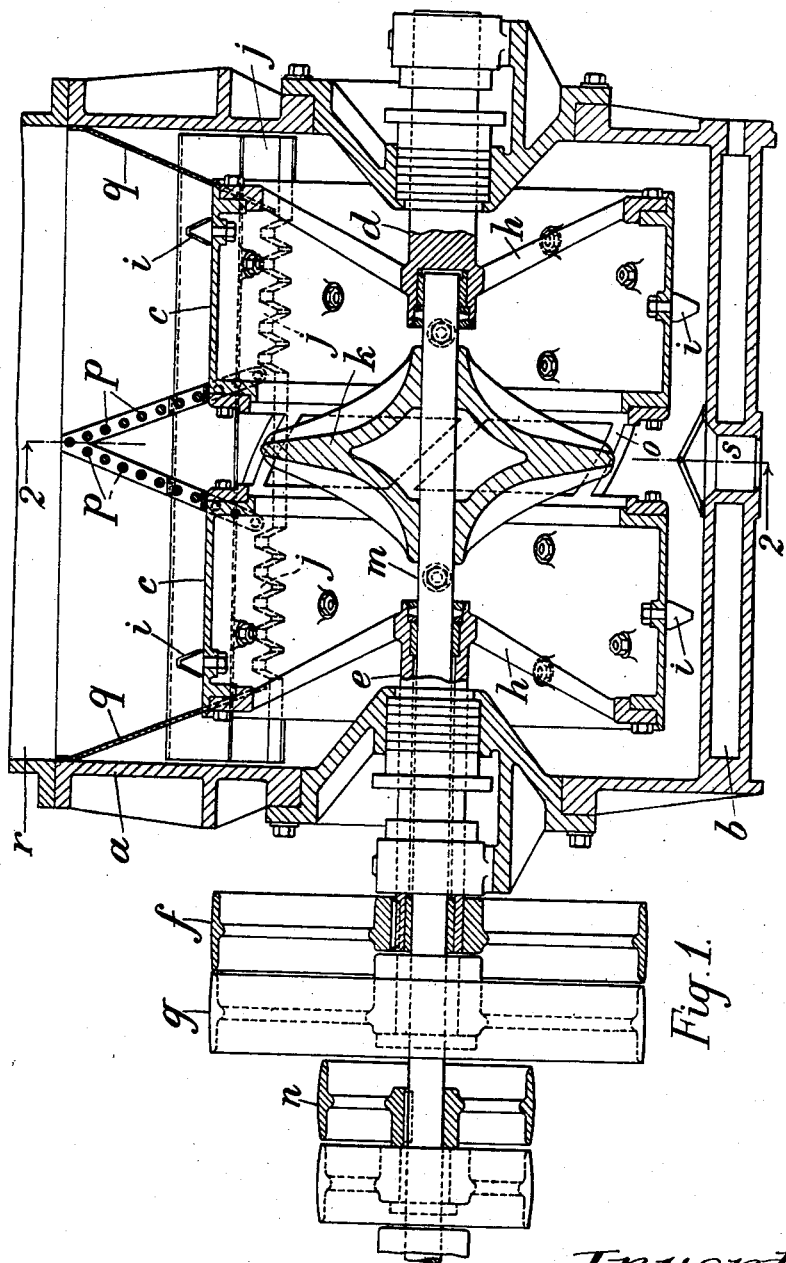
Figure 1 is a longitudinal sectional elevation of a rubber masticating machine constructed in one convenient form in accordance with this invention.
Figure 2:
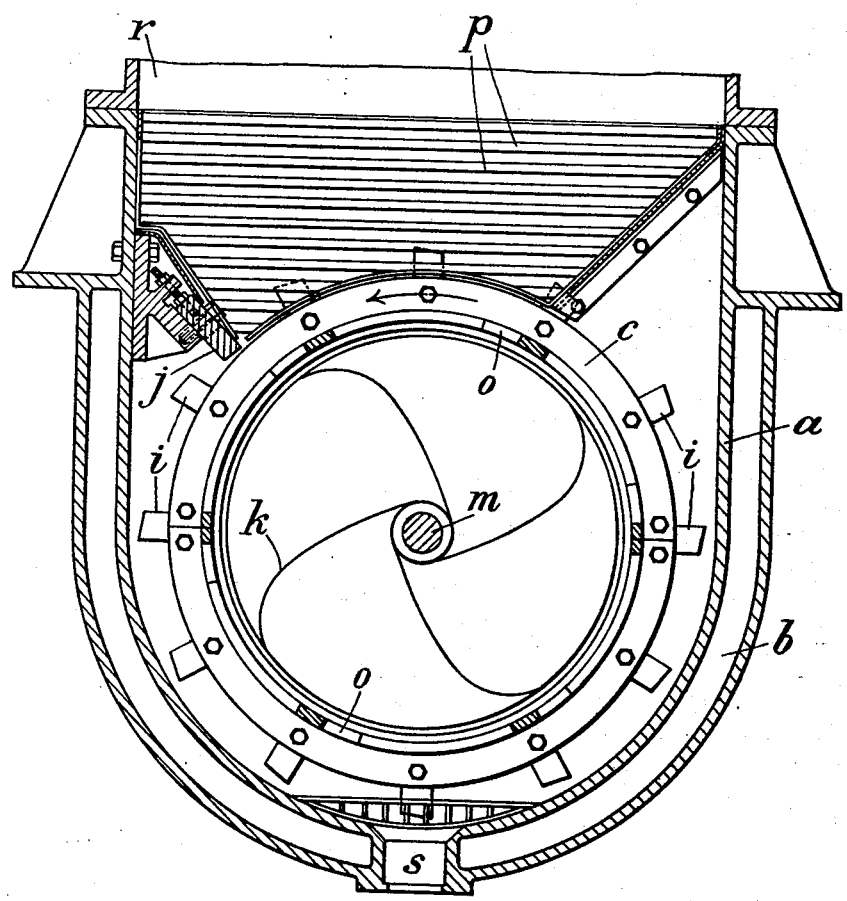
Figure 2 is a cross sectional view on the line 2—2 of Figure 1.

Secured to the periphery of the rotor are wedge shaped blades $i$ which, as shown in Figure 2, have their leading edges higher than their trailing edges. Cooperating with such rotor blades is a fixed blade $j$ which has gaps or slots therein for the passage of the rotor blades with a small clearance. Provision is made (as for example screws and nuts as shown in Figure 2) for adjusting the fixed blade $j$ relatively to the surface of the rotor $c$ in order to adjust the clearance between the rotor blades $i$ and the corresponding gaps or slots in the fixed blade. The blade $j$ is situated at one side of the bottom of the feed chute by which rubber is fed into the machine. The rotor blades $i$ are staggered around the rotor surface as shown so that each gap or slot in the fixed blade $j$ is passed through a plurality of times during each revolution of the rotor. The peripheral edge of the rotor comes sufficiently close to the bottom edge of the blade $j$ to prevent any considerable quantity of material being carried round adhering to the rotor periphery.

Within the rotor is disposed a double sided impeller $k$ carried by a shaft $m$ journalled in the rotor axles and driven by the fast pulley $n$. The rotor has a grid $o$ in its periphery surrounding the impeller $k$. Any material drawn into the impeller through the open ends of the rotor is delivered through said grid and then subjected to further mastication between the rotor and fixed blades $i$ and $j$ respectively. Above the grid $o$ in the rotor is arranged a fixed guard or grid $p$ which serves to prevent solid rubber which is being fed into the machine falling into the impeller. The grid $p$ comprises bars supported at their opposite ends.

Side plates $q$ prevent solid material dropping from the feed chute $r$ over the ends of the rotor.

Both the rotor $c$ and the impeller $k$ may be provided with multi or variable speed drives. The impeller $k$ may revolve in the opposite direction to the rotor $c$.

A suitable discharge outlet is provided at $s$.

More than one fixed cutter blade $j$ may be provided in the machine.

It is to be noted that this machine produces a solution in contradistinction to a machine for cutting and grinding rubber. The liquid in circulation (which is fed into the machine through the chute $r$) enters at the open or remote ends of the cylinder $c$ and passes out at the center through the grids $o$ and $p$ located adjacent the spaced inner ends of the cylinders. There is a vigorous circulation of liquid from the grid $o$, along the outside of the cylinders $c$ and back through the interior of the cylinders to the impeller $k$. The rubber at first leaves the feed chute $r$ at the side adjacent the fixed blade $j$ and is carried around and mixed with the liquid outside the cylinders $c$. Such liquid carries the rubber with it in its circulation around and through the cylinders $c$ under the action of the impeller $k$. The liquid is ultimately discharged through $s$. It is to be noted that the grid $o$ serves to hold the cylindrical parts $c$ of the cylinder in aligned spaced and fixed relation. The blades $i$ are spaced to give an even action throughout each revolution and this is important in order to insure an even running of the machine.

It will be seen that with our construction of machine, in addition to the masticating action of the blades $i$ and $j$, the impeller $k$ sets up a very considerable movement in and circulation of the material under treatment.

What I claim is:

1. A machine for masticating rubber comprising a horizontal casing having a feed chute at its upper side, a rotor in the form of axially spaced inter-connected hollow cylinders supported horizontally within the casing, means for rotating said rotor, a series of projecting wedge shaped blades on the outer periphery of each of the cylinders of the rotor, at least one fixed blade extending from side to side of the casing parallel to the rotor axis and adjacent to the periphery thereof and having wedge shaped gaps through which the wedge shaped blades pass on the rotation of the rotor, a double sided centrifugal impeller supported co-axially within the rotor between the spaced cylinders thereof, means for rotating said impeller, a grid located in the feed chute above the spaced cylinders and the impeller to prevent rubber falling on to the impeller from the feed chute, and guards to prevent rubber passing directly from said feed chute into the open ends of the cylinders of the rotor.

2. A rubber masticating machine as claimed in claim 1, in which means are provided for adjusting the fixed blade towards and away from the rotor periphery to vary the clearance between the rotary blades and the fixed blade, the latter serving also to remove from the rotor any substantial adhesions of rubber.

3. A rubber masticating machine as claimed in claim 1, in which a cylindrical grid is provided and is located about the impeller and fixed to the adjacent open ends of the cylinders of the rotor to form a means for maintaining the said cylinders in axially spaced relation.

NORMAN WAYLAND LOUSLEY.